United States Patent
Jarry

(10) Patent No.: US 9,356,310 B2
(45) Date of Patent: May 31, 2016

(54) METHOD FOR FORMING A MICROBATTERY

(71) Applicant: STMicroelectronics (Tours) SAS, Tours (FR)

(72) Inventor: Vincent Jarry, La Membrolle sur Choisille (FR)

(73) Assignee: STMICROELECTRONICS (TOURS) SAS, Tours (FR)

( * ) Notice: Subject to any disclaimer, the term of this patent is extended or adjusted under 35 U.S.C. 154(b) by 489 days.

(21) Appl. No.: 13/765,255

(22) Filed: Feb. 12, 2013

(65) Prior Publication Data

US 2013/0216904 A1   Aug. 22, 2013

(30) Foreign Application Priority Data

Feb. 17, 2012   (FR) ..................................... 12 51467

(51) Int. Cl.
| | |
|---|---|
| *H01M 10/04* | (2006.01) |
| *H01M 6/00* | (2006.01) |
| *H01M 2/04* | (2006.01) |
| *H01M 2/30* | (2006.01) |
| *H01M 6/40* | (2006.01) |
| *H01M 10/0585* | (2010.01) |

(52) U.S. Cl.
CPC ........ *H01M 10/0436* (2013.01); *H01M 2/0404* (2013.01); *H01M 2/0469* (2013.01); *H01M 2/30* (2013.01); *H01M 6/00* (2013.01); *H01M 6/40* (2013.01); *H01M 10/0585* (2013.01); *Y10T 29/49108* (2015.01); *Y10T 29/49114* (2015.01); *Y10T 29/49115* (2015.01)

(58) Field of Classification Search
None
See application file for complete search history.

(56) References Cited

U.S. PATENT DOCUMENTS

| | | | |
|---|---|---|---|
| 5,238,757 A * | 8/1993 | Suzuki et al. | 429/94 |
| 2004/0081860 A1* | 4/2004 | Hundt et al. | 429/7 |
| 2007/0275300 A1 | 11/2007 | Salot et al. | |
| 2008/0003492 A1* | 1/2008 | Bates | 429/66 |
| 2009/0011330 A1 | 1/2009 | Onodera et al. | |
| 2009/0155685 A1 | 6/2009 | Salot et al. | |
| 2011/0052979 A1* | 3/2011 | Bouillon et al. | 429/185 |

OTHER PUBLICATIONS

French Search Report and Written Opinion dated Nov. 12, 2012 from corresponding French Application No. 12/51467.

* cited by examiner

*Primary Examiner* — Patrick Ryan
*Assistant Examiner* — Haixia Zhang
(74) *Attorney, Agent, or Firm* — Allen, Dyer, Doppelt, Milbrath & Gilchrist, P.A. Attorneys at Law

(57) ABSTRACT

A method for forming a microbattery including, on a surface of a first substrate, one active battery element and two contact pads, this method including the steps of: a) forming, on a surface of a second substrate, two contact pads with a spacing compatible with the spacing of the pads of the first substrate; and b) arranging the first substrate on the second substrate so that the surfaces face each other and that the pads of the first substrate at least partially superpose to those of the second substrate, where a portion of the pads of the second substrate is not covered by the first substrate.

14 Claims, 3 Drawing Sheets

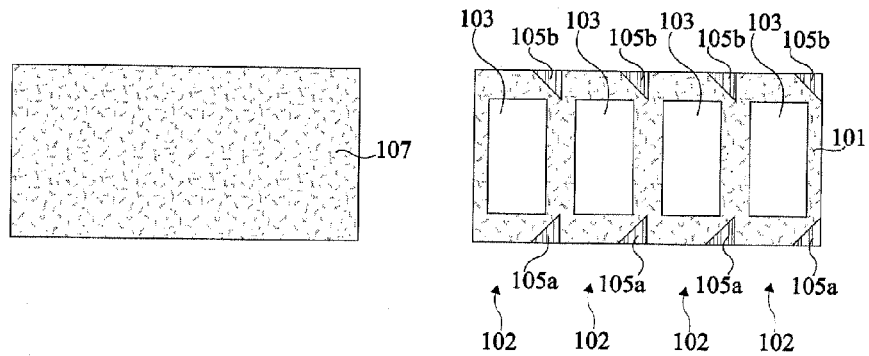
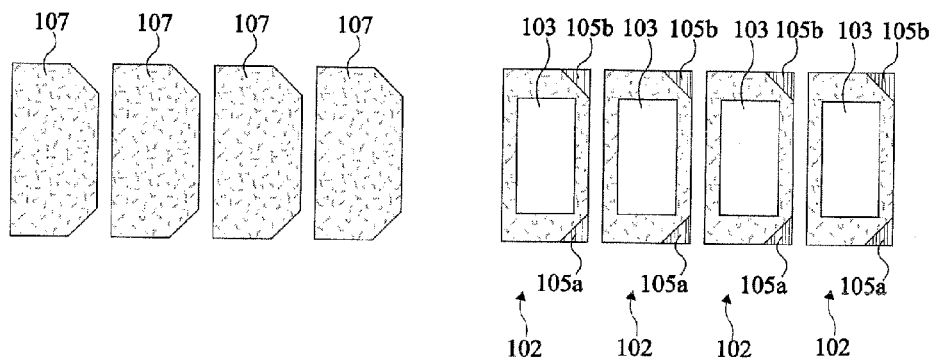
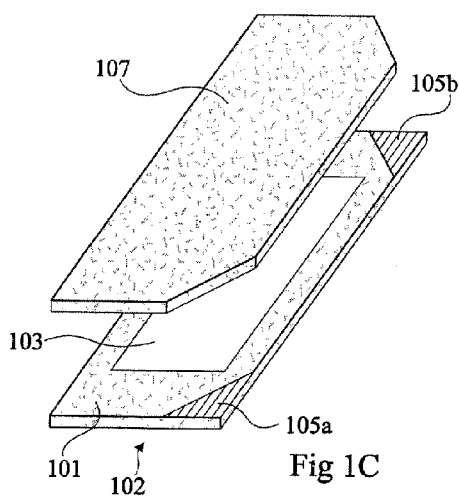
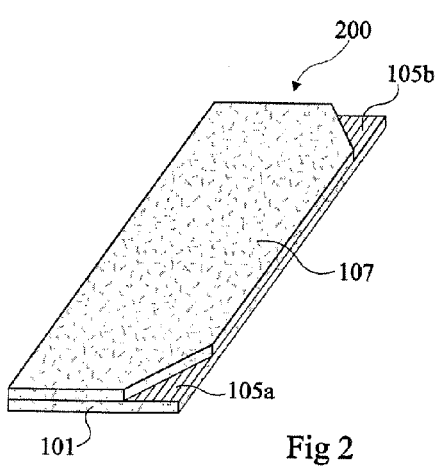

METHOD FOR FORMING A MICROBATTERY

CROSS REFERENCE TO RELATED APPLICATIONS

This application claims the priority benefit of French patent application number 12/51467, filed on Feb. 17, 2011, which is hereby incorporated by reference to the maximum extent allowable by law.

BACKGROUND

1. Technical Field

The present disclosure relate to a method for forming a microbattery, and to a microbattery capable of being formed by said method.

2. Discussion of the Related Art

Term "microbattery" generally designates an assembly comprising, on a support substrate, a stack of thin layers forming an active battery element, and contact pads connected to electrodes of the active element. The assembly further comprises a protective coating only leaving access to the contact pads of the microbattery. The total thickness of a microbattery typically approximately ranges from a few tens to a few hundreds of $\mu m$, for a surface area ranging from a few mm2 to a few $cm^2$, which enables to house the battery in very small spaces and further enables to form flexible batteries.

Existing methods for forming microbatteries have the disadvantage that certain manufacturing steps comprise relatively meticulous and lengthy manipulations, necessitating the use of expensive specific equipment. In particular, the bonding of the protective coating of a microbattery is a delicate operation which requires specific equipment and significantly limits microbattery production rates.

Further, a disadvantage of existing microbatteries is that the means for bonding the protective coating to the support substrate have a relatively low resistance to heat. There thus is a risk of separation of the protective coating when the temperature exceeds a threshold, which limits the maximum temperature at which the battery can be used.

SUMMARY

An embodiment provides a method for forming a microbattery overcoming at least some of the disadvantages of existing methods.

Another embodiment provides a method for forming a microbattery enabling to bond a protective coating on microbatteries more easily and faster than in existing methods.

Another embodiment provides a microbattery at least partly overcoming some of the disadvantages of existing microbatteries.

Another embodiment provides a microbattery in which the protective coating bonding means have a higher resistance to heat than in existing microbatteries.

Thus, an embodiment provides a method for forming a microbattery comprising, on a surface of a first substrate, one active battery element and two contact pads, this method comprising the steps of a) forming, on a surface of a second substrate, two contact pads with a spacing compatible with the spacing of the pads of the first substrate; and b) arranging the first substrate on the second substrate so that said surfaces face each other and that the pads of the first substrate at least partially superpose to those of the second substrate, where a portion of the pads of the second substrate is not covered by the first substrate.

According to an embodiment, at step a), a plurality of pairs of contact pads are formed on the second substrate and, at step b), a plurality of substrates, each supporting one active element and two contact pads, are arranged on the second substrate, a subsequent step of dicing of the second substrate being provided to separate the micro-batteries from one another.

According to an embodiment, the method comprises a step of bonding the first substrate to the second substrate by bonding means resistant to temperatures greater than 100° C.

According to an embodiment, the bonding means comprise an electrically-conductive glue connecting the pads of the first substrate to the pads of the second substrate.

According to an embodiment, the bonding means comprise solder paste connecting the pads of the first substrate to the pads of the second substrate.

According to an embodiment, the bonding means comprise a non-conductive glue connecting at least some regions of the first and second substrates.

According to an embodiment, the bonding means comprise a molded resin layer coating the surface of the first substrate opposite to the active element.

According to an embodiment, contact bumps are bonded to the portions of the pads of the second substrate which are not covered by the first substrate.

Another embodiment provides a microbattery comprising: on a surface of a first substrate, one active battery element and two contact pads; and, superposed to the first substrate on the active element side, a second substrate comprising two contact pads with a spacing compatible with the spacing of the contact pads of the first substrate, the pads of the first substrate at least partially facing the pads of the second substrate and being connected to these pads, where a portion of the pads of the second substrates is not covered by the first substrate.

According to an embodiment, the first and second substrates are connected by bonding means resistant to temperatures higher than 100° C.

The foregoing and other features and advantages will be discussed in detail in the following non-limiting description of specific embodiments in connection with the accompanying drawings.

BRIEF DESCRIPTION OF THE DRAWINGS

FIGS. 1A to 1C illustrate steps of an example of a method for manufacturing microbatteries;

FIG. 2 is a perspective view of a microbattery obtained by the method of FIGS. 1A to 1C;

DETAILED DESCRIPTION

Figure 3A:
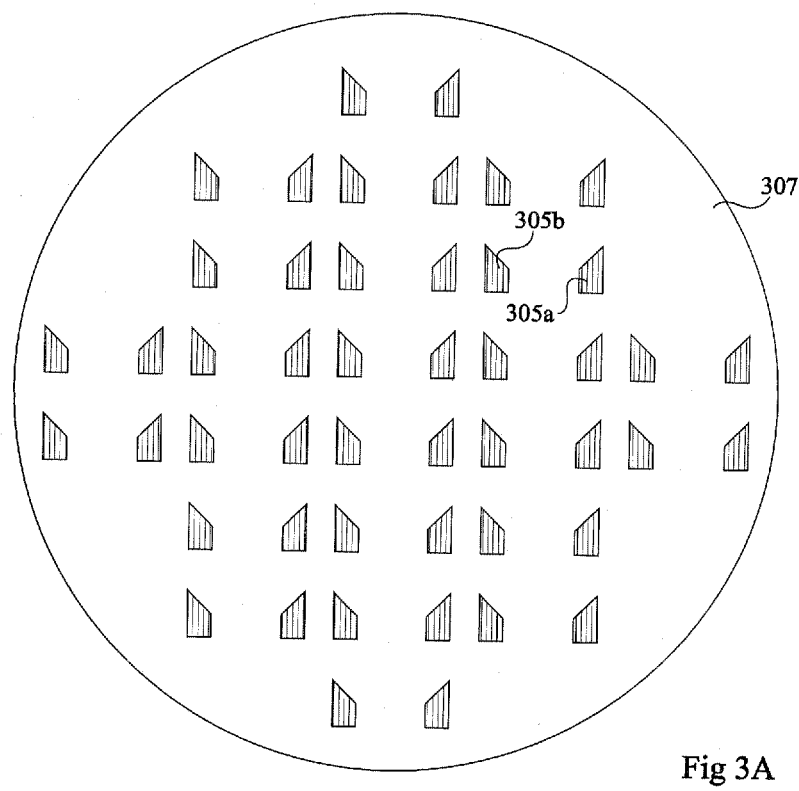
FIGS. 3A and 3B illustrate steps of an embodiment of a method for manufacturing microbatteries.

For clarity, the same elements have been designated with the same reference numerals in the different drawings and, further, the various drawings are not to scale. Further, only those elements which are useful to the understanding embodiments have been shown and will be described. In particular, in the embodiments described hereafter, the structure and the method for manufacturing the active battery element used have not been detailed, embodiments being compatible with all types of active battery elements known by those skilled in the art.

FIGS. 1A to 1C illustrate steps of an example of a method for manufacturing a microbattery.

FIG. 1A is a top view illustrating, in its right-hand portion, the forming, on a surface of a support substrate 101, of a plurality of cells 102 each corresponding to a microbattery, and each comprising one active battery element 103 and two metal contact pads 105a and 105b electrically connected to a positive electrode and to a negative electrode of active element 103. To simplify the diagrams, the connections between contact pads 105a and 105b and battery element 103 have not been shown. Support substrate 101, for example, is a substrate made of mica, glass, or any other adapted material. The thickness of substrate 101 is preferably smaller than a few hundreds of μm, for example, smaller than 200 μm. In a specific example, substrate 101 has a substantially rectangular shape of approximately 5.5 by 2.5 cm, and four cells 102 each having a substantially rectangular shape of approximately 2.5 by 1.3 cm are formed on the upper surface of substrate 101. More generally, other substrate and cell shapes and/or dimensions may be provided. In the shown example, battery element 103 occupies an approximately central region of cell 102, and contact pads 105a and 105b are located at two corners of the cell.

As illustrated in the left-hand portion of FIG. 1A, in addition to support substrate 101 on which cells 102 are formed, it is provided to use a second substrate 107 which will be used, in subsequent steps (FIGS. 1B and 1C), to form a protective coating for microbatteries. Substrate 107 for example is a substrate of same nature and of same dimensions as substrate 101, but on which no contact pad and no active battery element has been formed.

FIG. 1B is a top view illustrating, in its right-hand portion, a step during which elementary cells 102 are separated from one another by dicing of support substrate 101 into elementary pieces.

Simultaneously, as illustrated in the left-hand portion of FIG. 1B, substrate 107 is also diced into elementary pieces intended to be used as a protective coating for cells 102. Each elementary piece of substrate 107 has approximately the same shape and the same dimensions as the portion of substrate 101 of a cell 102 which is not coated with contact pads 105a and 105b. As an illustration, in the specific example mentioned hereabove, each substrate piece 107 has the shape of a rectangle of approximately 2.5 by 1.3 cm with two cut-out corners.

FIG. 1C is a perspective view illustrating a step subsequent to the dicing step described in relation with FIG. 1B, during which, on each elementary cell 102, a substrate piece 107 is arranged so that substrate 107 covers active element 103 and substrate 101 (on the active element side of the cell), thus only leaving access to contact pads 105a and 105b. To bond substrate 107 to substrate 101, the internal surface of substrate piece 107 is coated with glue, and then adjusted against cell 102.

FIG. 2 is a perspective view of a microbattery 200 obtained by the method described in relation with FIGS. 1A to 1C. Active element 103 (not visible in FIG. 2) is protected from outside elements such as humidity, air, dust, etc. by support substrate 101, coating 107, and the glue for bonding coating 107 to substrate 101. Contact pads 105a and 105b allows electric contacts on the electrodes of active element 103.

A disadvantage of the method described in relation with FIGS. 1A to 1C is that the steps of dicing of coating substrate 107, of coating of substrate pieces 101 and 107 with glue, and of arranging of substrate pieces 107 on substrate pieces 101 are relatively delicate and imply the use of expensive equipment. Further, these steps are relatively lengthy, which decreases the microbattery production rate.

Another disadvantage is that the glues available to bond protective coating 107 have a relatively low resistance to heat. As an example, beyond from 60 to 70° C., the glue softens, to such an extent that coating 107 risks separating from the rest of the microbattery, thus partially or totally exposing active element 103. This limits the temperature at which microbatteries can be used, and further forbids, on assembly of microbatteries in electronic systems, exceeding temperatures on the order of from 60 to 70° C., which is particularly constraining.

Figure 3B:
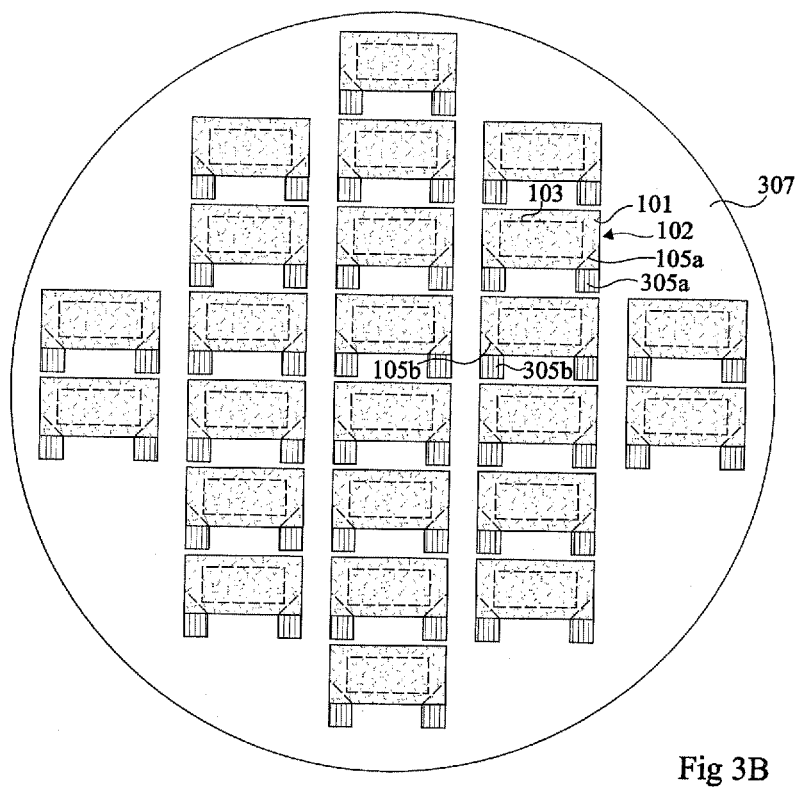

FIGS. 3A and 3B are top views illustrating steps of an embodiment of a method for manufacturing microbatteries.

The method described in relation with FIGS. 3A and 3B uses elementary cells 102 of the type described in relation with FIG. 1B, that is, comprising, on a surface of a support substrate 101, an active battery element 103 and two contact pads 105a and 105b respectively connected to a positive electrode and to a negative electrode of active element 103. Cells 102 may be manufactured with the method described in relation with FIGS. 1A and 1B, or by any other method capable of forming cells of this type. The method described hereafter more specifically relates to the bonding of a protective coating on cells 102.

FIG. 3A illustrates a step of forming, on a substrate 307, or wafer, intended to be used as a protective coating for cells 102, a plurality of pairs of contact pads, each comprising a pad 305a and a pad 305b spaced apart by a distance compatible with the spacing of contact pads 105a and 105b of a cell 102. Contact pads pairs 305a, 305b are sufficiently spaced apart from one another to enable cells 102 to be laid flat on substrate 307, so that their contact pads 105a and 105b respectively face contact pads 305a and 305b of substrate 307 and that cells 102 do not overlap. In this example, substrate 307 has, in top view, much greater dimensions than a cell 102, that is, substrate 307 can receive a large number of cells 102, for example at least 10 cells 102.

In one embodiment, substrate 307 has substantially the same shape and the same dimensions as substrates conventionally used to manufacture semiconductor chips. In other words, in one embodiment, substrate 307 is compatible with equipment already existing in semiconductor chip manufacturing processes, and can be processed and manipulated by using such equipment. As an example, substrate 307 is a glass or mica substrate of generally circular shape, with a diameter of approximately 8 inches, that is, approximately 20 cm, with a thickness smaller than a few hundred μm, for example, smaller than 200 μm. Of course, substrates made of other materials and/or having other shapes and other dimensions may be used.

As an example, contact pads 305a, 305b are made of copper or of a stack of thin metal layers having different compositions, for example, a titanium-nickel-copper-gold stack currently designated as UBM in the art, and have a total thickness on the order of a few μm, for example, ranging between 1 and 5 μm. Pads 305a, 305b are for example formed by using already existing equipment for forming metal contact pads on semiconductor wafers.

FIG. 3B illustrates a step during which cells 102 are arranged on substrate 307 so that the surface of support substrate 101 of the cells supporting active element 103 and contact pads 105a and 105b faces the surface of substrate 307 supporting contact pads 305a and 305b. Cells 102 are arranged so that their contact pads 105a and 105b at least partially superpose to contact pads 305a and 305b of substrate 307, and so that a portion of pads 305a and 305b is not covered with substrate 101. Pads 305a, 305b of substrate 307 preferably have a larger surface area than pads 105a, 105b of the cells. In the shown example, each pad 305a, 305b comprises a triangular portion having a shape substantially corresponding to the shape of a pad 105a, 105b of a cell 102 and to which the corresponding pad 105a, 105b superposes, and a square or rectangular portion adjacent to the triangular portion, not covered with substrate 101 of cell 102. Of course, the contact pads of substrate 307 and of cells 102 may have other shapes than those described hereabove.

As an example, cells 102 may be arranged on substrate 307 by using equipment already existing in semiconductor chip device manufacturing processes to arrange discrete chips on a substrate wafer.

It should already be noted that an advantage of the method described in relation with FIGS. 3A and 3B is that it can be implemented by using equipment already existing in conventional semiconductor chip manufacturing processes. This makes it possible to use technologies already known for semiconductor chip device manufacturing, but which were up to now not available in microbattery manufacturing processes. In particular, this enables to use, to bond cells 102 to substrate 307, bonding means, and in particular glues, resistant to higher temperatures than glues used in methods of the type described in relation with FIGS. 1A to 1B. It may, for example, be provided to use an electrically-conductive glue resistant to temperatures higher than from 100 to 130° C., and preferably higher than 150° C., to connect contact pads 105a, 105b to contact pads 305a, 305b, and a non-conductive glue, for example, based on epoxy, resistant to temperatures higher than from 100 to 130° C., and preferably higher than 150° C., to connect substrates 101 and 307. The non-conductive glue is for example deposited at the periphery of substrate 101, after cell 102 has been arranged on substrate 307, and penetrates by capillarity between substrate 101 and substrate 307. As a variation, the glue may be deposited on substrate 307 and/or on substrate 101 before cell 102 is arranged on substrate 307, or injected between substrate 101 and substrate 307 after cell 102 has been arranged on substrate 307. Other encapsulation and sealing techniques may be used, it being understood that it will be preferably be chosen to use bonding means at least resistant to a temperature from 100 to 130° C., and preferably higher than 150° C.

As a variation, rather than conductive glue, a low-temperature soldering, for example, by means of a solder paste deposited at from approximately 100 to 130° C., may be provided to connect pads 105a, 105b to pads 305a, 305b. It should be noted that a high-temperature soldering should not be used since this would damage the active microbattery element, since usual active battery elements generally do not resist temperatures higher than from approximately 150 to 160° C.

After cells 102 have been arranged on and bonded to substrate 307, a dicing step, not shown, is provided to separate the microbatteries from one another. The dicing step is, for example, carried out by using equipment already existing in semiconductor chip manufacturing processes to dice a semiconductor wafer into discrete chips.

An advantage of the method described in relation with FIGS. 3A and 3B is that the steps of arranging and bonding of cells 102 on substrate 307 and of dicing of substrate 307 may be carried out by using existing equipment of conventional semiconductor chip device manufacturing processes. This enables, on the one hand, to decrease equipment costs, and on the other hand to significantly increase microbattery production rates. This further enables to provide microbattery inspection and testing steps, such as are already provided in semiconductor chip manufacturing.

Figure 4:
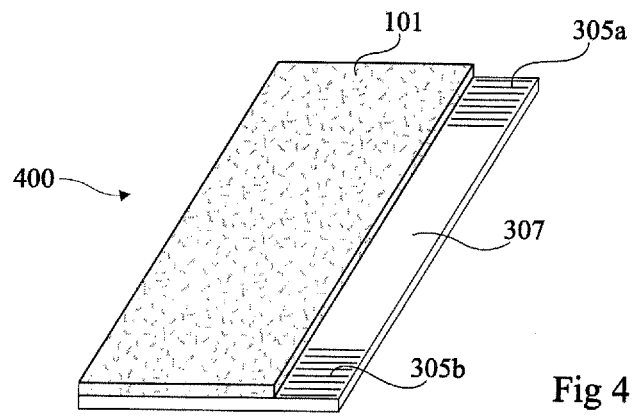
FIG. 4 is a perspective view illustrating an embodiment of a microbattery capable of being obtained by the method described in relation with FIGS. 2A and 2B.

FIG. 4 is a perspective view of a microbattery 400 capable of being obtained by the manufacturing method described in relation with FIGS. 3A and 3B. Microbattery 400 comprises, on one surface of a support substrate 101, one active battery element 103 and two contact pads 105a, 105b (not visible in the drawing) and, superposed to substrate 101 (on the active element and contact pad side), a coating substrate 307 comprising two contact pads 305a and 305b respectively partially facing pads 105a and 105b, where a portion of pads 305a, 305b is not covered with substrate 101. Support substrate 101, coating substrate 307, and the bonding means connecting substrate 101 to substrate 307 form elements of a package protecting active element 103 from outside elements such as humidity, air, dust, etc. Conductive pads 305a and 305b allow electric contacts on the electrodes of active element 103.

Figure 5:
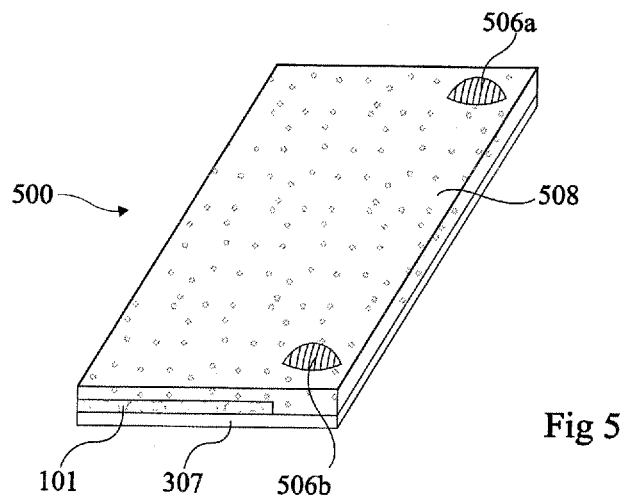
FIG. 5 is a perspective view illustrating another embodiment of a microbattery.

FIG. 5 is a perspective view of an alternative embodiment of a microbattery 500. Microbattery 500 differs from microbattery 400 of FIG. 4 in that it comprises, in addition to the elements already described in relation with FIG. 4, two contact bumps 506a and 506b respectively bonded to the portions of contact pads 305a and 305b which are not coated with substrate 101. Further, microbattery 500 comprises a resin layer 508 coating the surface of substrate 101 opposite to active element 103, as well as the portion of the surface of substrate 307 located on the side of active element 103 and not coated with substrate 101. Resin layer 508 only leaves access to the upper portion of contact bumps 506a, 506b. Bumps 506a and 506b ease the contact with the active battery element electrodes. Layer 508 strengthens the bonding of substrate 101 to substrate 307, thus improving the protection of the active element.

As an example, to form microbattery 500, it may first be provided, after the forming of contact pads 305a, 305b on substrate 307 (FIG. 3A) and before the step of arranging substrates 101 on substrate 307, to bond contact pads 506a, 506b to the portion of contact pads 305a, 305b which is not intended to be covered with substrates 101. This enables bonding bumps 506a, 506b at relatively high temperatures without risking damage to active battery elements 103.

Then, after the step of arranging and bonding cells 102 on substrate 307 (FIG. 3B) and before the step of dicing substrate 307, it may be provided to deposit a resin layer 508 having a thickness smaller than the bump height, over the entire surface of substrate 307. A mold is, for example, positioned above substrate 307 to avoid for resin to deposit on the upper portion of bumps 506a, 506b, and resin 508 is then injected between the mold and substrate 307. The thickness of resin 508 coating substrates 101 may be on the order of a few tens of vim, for example, between 20 and 60 μM.

A step of dicing resin layer 508 and substrate 307 is then provided, to separate microbatteries 500 from one another.

FIGS. 6 to 10 are top views schematically illustrating, as an example, various shapes that may be taken by the contact pads formed, at the step described in relation with FIG. 3A, on substrate 307 intended to be used as a protective coating for cells 102. In the drawings, the left-hand portion of the pad corresponds to the portion of the pad on which, at the step described in relation with FIG. 3B, a corresponding pad 105a, 105b of a cell 102 superposes, and the right-hand portion of the pad corresponds to the pad portion which is not covered with substrate 101 of a cell 102. In these examples, a rectilinear track portion connects the left-hand portion of the contact pad to its right-hand portion.

Figure 6:
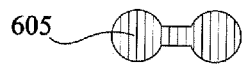
FIGS. 6 to 10 are top views schematically illustrating examples of the shape of microbattery contact pads.

FIG. 6 shows a pad 605 having approximately circular left-hand and right-hand portions.

Figure 7:

FIG. 7 shows a pad 705 having a substantially square or rectangular left-hand portion and having an approximately circular right-hand portion.

Figure 8:

FIG. 8 shows a pad 805 having a substantially triangular left-hand portion and having an approximately circular right-hand portion.

Figure 9:

FIG. 9 shows a pad 905 having a substantially circular left-hand portion and having an approximately square or rectangular right-hand portion.

Figure 10:

FIG. 10 shows a pad 1005 having a substantially circular left-hand portion and having an approximately triangular right-hand portion.

Contact pads 105a, 105b of cells 102 may be adapted to the corresponding shapes of the left-hand portions of pads 605, 705, 805, 905, and 1005. Of course, the contact pads of substrate 307 and of cells 102 may have other shapes than those described hereabove.

Specific embodiments have been described. Various alterations, modifications, and improvements will occur to those skilled in the art. In particular, microbatteries each comprising a single active battery element 103 have been described hereabove. Embodiments are not limited to this specific case and it may be provided to form microbatteries each comprising several interconnected active elements, where these elements may be juxtaposed or superposed, and covered with a same protective coating.

Further, embodiments are not limited to the substrate and cell shapes, dimensions, and materials mentioned as an example in the present description.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for forming a plurality of microbatteries, the method comprising:
providing a plurality of first substrates, each first substrate having a first surface, an active battery element on the first surface, and a first contact pad pair on the first surface and being associated with the active battery element;
forming, on a second surface of a second substrate, a second plurality of contact pad pairs, the second substrate being separate from the plurality of first substrates during the forming of the second plurality of contact pad pairs; and
positioning the plurality of first substrates on the second substrate so that
the first surfaces of the plurality of first substrates and the second surface face each other,
the first contact pad pairs of the plurality of first substrates are aligned with and at least partially superposes the second plurality of contact pad pairs of the second substrate, and
a portion of each second contact pad pair of the second substrate is not covered by respective ones the plurality of first substrates;
subsequent to the positioning, bonding the plurality of first substrates on to the second substrate; and
dicing the second substrate to define each first substrate from the plurality thereof as a microbattery.

2. The method of claim 1, wherein the bonding of the plurality of first substrates to the second substrate is by bonding material resistant to temperatures greater than 100° C.

3. The method of claim 2, wherein the bonding material comprises an electrically-conductive glue connecting the first contact pad pairs of the plurality of first substrates to the second plurality of contact pad pairs of the second substrate.

4. The method of claim 2, wherein the bonding material comprises solder paste connecting the first contact pad pairs of the plurality of first substrates to the second plurality of contact pad pairs of the second substrate.

5. The method of claim 2, wherein the bonding material comprises a non-conductive glue connecting at least some regions of the plurality of first substrates and the second substrate.

6. The method of claim 2, wherein the bonding material comprises a molded resin layer coating a surface of the plurality of first substrates opposite to the active element.

7. The method of claim 1, further comprising forming a plurality of contact bumps on the portion of each second contact pad pair of the second substrate that is not covered by the plurality of first substrates.

8. A method for forming a plurality of microbatteries, the method comprising:
providing a plurality of first substrates, each first substrate having a first surface, an active battery element on the first surface, and a first contact pad pair on the first surface and being associated with the active battery element;
forming, on a second surface of a second glass substrate, a second plurality of contact pad pairs, the second glass substrate being separate from the plurality of first substrates during the forming of the second plurality of contact pad pairs; and
positioning the plurality of first substrates on the second glass substrate so that
the first surfaces of the plurality of first substrates and the second surface face each other,
the first contact pad pairs of the plurality of first substrates are aligned with and at least partially superposes the second plurality of contact pad pairs of the second glass substrate, and
a portion of each second contact pad pair of the second glass substrate is not covered by respective ones the plurality of first substrates;
subsequent to the positioning, bonding the plurality of first substrates on to the second glass substrate; and
dicing the second glass substrate to define each first substrate from the plurality thereof as a microbattery.

9. The method of claim 8, wherein the bonding of the plurality of first substrates to the second substrate is by bonding material resistant to temperatures greater than 100° C.

10. The method of claim 9, wherein the bonding material comprises an electrically-conductive glue connecting the first contact pad pairs of the plurality of first substrates to the second plurality of contact pad pairs of the second substrate.

11. The method of claim 9, wherein the bonding material comprises solder paste connecting the first contact pad pairs of the plurality of first substrates to the second plurality of contact pad pairs of the second substrate.

12. The method of claim 9, wherein the bonding material comprises a non-conductive glue connecting at least some regions of the plurality of first substrates and the second substrate.

13. The method of claim 9, wherein the bonding material comprises a molded resin layer coating a surface of the plurality of first substrates opposite to the active element.

14. The method of claim 8, further comprising forming a plurality of contact bumps on the portion of each second contact pad pair of the second substrate that is not covered by the plurality of first substrates.

\* \* \* \* \*